United States Patent
Chang (10) Patent No.: US 9,652,878 B2
(45) Date of Patent: May 16, 2017

(54) ELECTRONIC DEVICE AND METHOD FOR ADJUSTING PAGE

(71) Applicant: FIH (HONG KONG) LIMITED, Kowloon (HK)

(72) Inventor: Chih-Hao Chang, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 194 days.

(21) Appl. No.: 14/690,832

(22) Filed: Apr. 20, 2015

(65) Prior Publication Data

US 2016/0189344 A1 Jun. 30, 2016

(30) Foreign Application Priority Data

Dec. 30, 2014 (TW) .............................. 103146306 A (51) Int. Cl.
| | |
|---|---|
| *G09G 5/00* | (2006.01) |
| *G06T 11/60* | (2006.01) |
| *G06F 3/01* | (2006.01) |
| *G06F 3/00* | (2006.01) |
| *G06F 3/03* | (2006.01) |
| *G06K 9/00* | (2006.01) |

(52) U.S. Cl.
CPC .............. *G06T 11/60* (2013.01); *G06F 3/005* (2013.01); *G06F 3/012* (2013.01); *G06F 3/0304* (2013.01); *G06K 9/00228* (2013.01)

(58) Field of Classification Search
None
See application file for complete search history.

(56) References Cited

U.S. PATENT DOCUMENTS

| | | | | |
|---|---|---|---|---|
| 6,864,912 | B1 * | 3/2005 | Mahaffey | ............... G06F 3/012 348/14.01 |
| 8,624,927 | B2 * | 1/2014 | Ohmori | ................... G06F 3/012 345/156 |
| 9,152,229 | B2 * | 10/2015 | Takatsuka | ............... G06F 3/012 |
| 2009/0295832 | A1 * | 12/2009 | Takatsuka | ............... G06F 3/012 345/659 |
| 2012/0287163 | A1 * | 11/2012 | Djavaherian | ............ G09G 5/00 345/667 |
| 2013/0057553 | A1 * | 3/2013 | Chakravarthula | ....... G06F 3/011 345/468 |

* cited by examiner

*Primary Examiner* — Ryan R Yang
(74) *Attorney, Agent, or Firm* — Steven Reiss (57) ABSTRACT

A method for adjusting a page includes determining a selected page on a display device of the electronic device. An image of a user of the electronic device is acquired at a predetermined time interval using a camera module of the electronic device. A facial contour is recognized from the acquired image and a circumcircle of the recognized facial contour is computed. A reference circumcircle corresponding to a reference facial contour of the user is acquired from a storage device of the electronic device. According to the computed circumcircle and the reference circumcircle, an adjustment ratio of the selected page and an adjustment direction of the selected page are computed. According to the adjustment ratio and the adjustment direction of the selected page, the selected page is adjusted.

15 Claims, 6 Drawing Sheets

ELECTRONIC DEVICE AND METHOD FOR ADJUSTING PAGE

CROSS-REFERENCE TO RELATED APPLICATIONS

This application claims priority to Taiwan Patent Application No. 103146306 filed on Dec. 30, 2014, the contents of which are incorporated by reference herein.

FIELD

The subject matter herein generally relates to page processing technology, and particularly to adjusting a page using an electronic device.

BACKGROUND

When a user is looking through a page, if a distance between the user and a display device of the electronic device is too far or too near, sizes of characters on the page are too small or too big for the user. The user has to zoom in the page or zoom out the page manually until the user is satisfied with the adjusted sizes of characters.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

Figure 1:
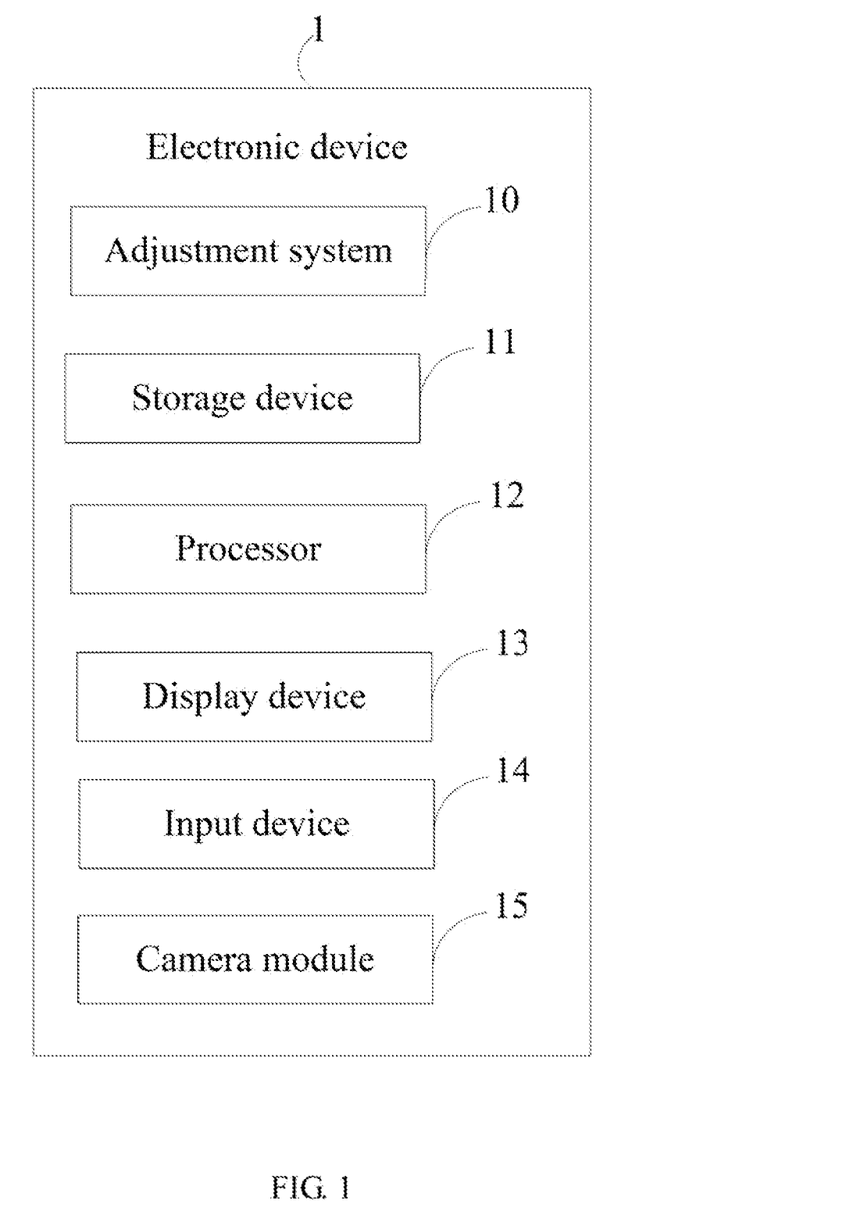
FIG. 1 is a block diagram of one embodiment of an electronic device including an adjustment system.

FIG. 1 illustrates a block diagram of one embodiment of an electronic device. In at least one embodiment as shown in FIG. 1, an electronic device 1 includes, but is not limited to, an adjustment system 10, a storage device 11, at least one processor 12, a display device 13, an input device 14 and a camera module 15. The electronic device 1 can be a tablet computer, a notebook computer, a smart phone, a personal digital assistant (PDA), or another suitable electronic device. FIG. 1 illustrates only one example of the electronic device that can include more or fewer components than illustrated, or have a different configuration of the various components in other embodiments.

When a user is looking through a page, the adjustment system 10 can automatically adjust a size of the page according to a distance between the user and the display device 13.

In at least one embodiment, the storage device 11 can include various types of non-transitory computer-readable storage medium. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. The at least one processor 12 can be a central processing unit (CPU), a microprocessor, or other data processor chip that performs functions of the adjustment system 10 in the electronic device 1. The camera module 15 can capture images or videos, and the display device 13 can display the images and the videos. The input device 14 can be a mouse, a keyboard, or a touch panel.

Figure 2:
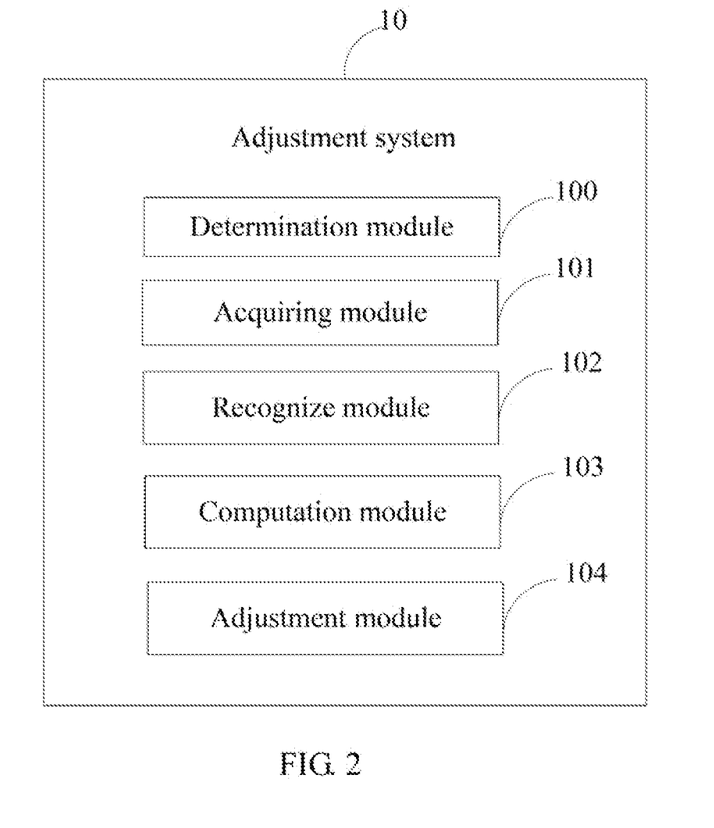
FIG. 2 is a block diagram of one embodiment of function modules of the adjustment system in the electronic device of FIG. 1.

FIG. 2 is a block diagram of one embodiment of function modules of the adjustment system. In at least one embodiment, the adjustment system 10 can include a determination module 100, an acquiring module 101, a recognizing module 102, a computation module 103 and an adjustment module 104. The function modules 100, 101, 102, 103 and 104 can include computerized codes in the form of one or more programs, which are stored in the storage device 11. The at least one processor 12 executes the computerized codes to provide functions of the function modules 100-104.

When the user selects a page on the display device 13, the determination module 100 determines the selected page. For example, the selected page can be a web page, a page provided by an application, a page of user interface (UI) of the electronic device 1.

The camera module 15 of the electronic device 1 captures an image of the user at a predetermined time interval. The acquiring module 101 acquires the image of the user.

The recognizing module 102 recognizes a facial contour from the acquired image. The recognizing module 102 computes a circumcircle of the recognized facial contour.

A reference facial contour of the user and a reference circumcircle corresponding to the reference facial contour are pre-stored in the storage device 11. The acquiring module 101 acquires the reference circumcircle from the storage device 11. In at least one embodiment, the adjustment system 10 provides a plurality of facial contours for the user to set or select the reference facial contour. Each of the facial contours has a different size. In at least one embodiment, each of the facial contours corresponds to a distance between the user and the display device 13. The reference facial contour corresponds to a reference distance.

The computation module 103 computes an adjustment ratio of the selected page and an adjustment direction of the selected page according to the computed circumcircle and the reference circumcircle.

In at least one embodiment, the computation module 103 establishes a coordinate system according to the computed circumcircle and the reference circumcircle. A distance between a center of the computed circumcircle and a center of the reference circumcircle is predetermined. The distance is more than zero. The coordinate system can be a two-dimensional coordinate system or a three-dimensional coordinate system.

Figure 4:
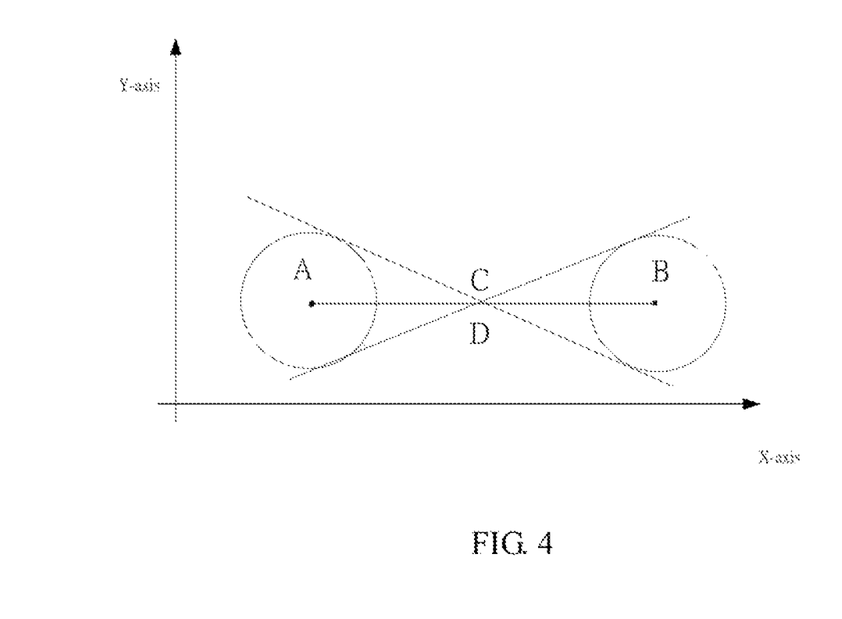
FIG. 4 is a diagram of a first example of a computed circumcircle and a reference circumcircle.

If a two-dimensional coordinate system is to be established, the computation module 103 connects the center of the computed circumcircle and the center of the reference circumcircle using a line. The computation module 103 establishes an X-axis of the two-dimensional coordinate system that is parallel to the line. A positive direction of the X-axis is the same as a direction from the center of the reference circumcircle to the center of the computed circumcircle. The computation module 103 establishes a line that is perpendicular to the X-axis as a Y-axis of the two-dimensional coordinate system. As shown in FIG. 4, "A" represents a center of a reference circumcircle, "B" represents a center of a computed circumcircle. A direction from A to B is determined to be a positive direction of the X-axis.

The computation module 103 computes a midpoint of a segment on the coordinate system. The segment includes a first endpoint and a second endpoint. In at least one embodiment, the first endpoint of the segment is the center of the computed circumcircle, and the second endpoint of the segment is the center of the reference circumcircle. In FIG. 4, as mentioned above, "A" represents the center of the reference circumcircle; "B" represents the center of the computed circumcircle. "AB" represents a segment. "C" represents a midpoint of the segment "AB".

The computation module 103 computes two internal common tangents between the computed circumcircle and the reference circumcircle on the coordinate system. The computation module 103 computes an intersection point of the two internal common tangents. The computation module 103 computes an offset of the computed intersection point relative to the computed midpoint of the segment and computes the adjustment ratio based on the computed offset. In at least one embodiment, the adjustment ratio is computed by multiplying the computed offset by a predetermined constant k. k is more than one. The computation module 103 computes the adjustment direction by computing a direction offset of the computed intersection point relative to the computed midpoint of the segment. In at least one embodiment, when an X-coordinate of the computed intersection point is less than an X-coordinate of the midpoint on the coordinate system, the direction offset is a negative direction, the adjustment direction is the negative direction. When the X-coordinate of the computed intersection point is more than the X-coordinate of the midpoint on the coordinate system, the direction offset is a positive direction, the adjustment direction is the positive direction.

In FIG. 4, as mentioned above, "A" represents the center of the reference circumcircle, "B" represents the center of the computed circumcircle, "C" represents the midpoint of the segment "AB", "D" represents a computed intersection point. Coordinates of the midpoint "C" is the same as coordinates of the computed intersection point "D". An offset of the computed intersection point "D" relative to the midpoint "C" is zero. A size of a selected page does not need to be adjusted.

Figure 5:
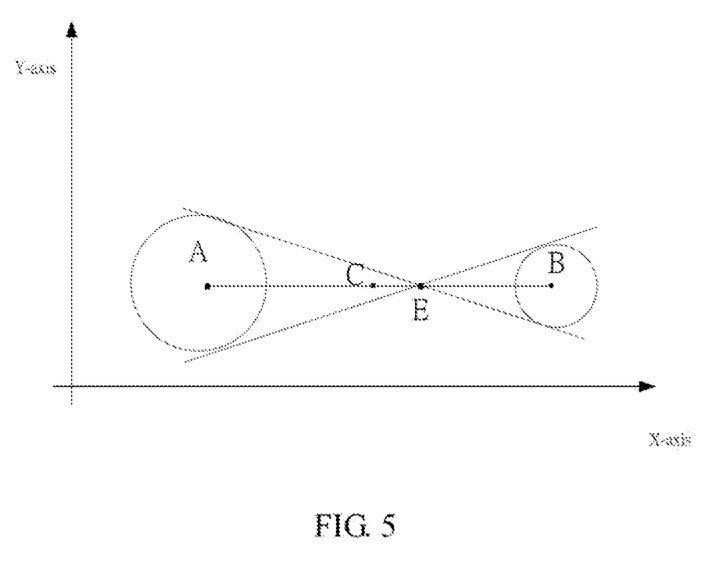
FIG. 5 is a diagram of a second example of a computed circumcircle and a reference circumcircle.

As shown in FIG. 5, "A" represents the center of the reference circumcircle, "B" represents the center of the computed circumcircle, "C" represents the midpoint of the segment "AB", "E" represents a computed intersection point. An offset of the computed intersection point "E" relative to the midpoint "C" is a distance between the computed intersection point "E" and the computed midpoint "C". An X-coordinate of the computed intersection point "E" is more than an X-coordinate of the midpoint "C". A direction offset of the computed intersection point "E" relative to the midpoint "C" is positive, therefore, an adjustment direction of a selected page is a positive direction. It is represented that a distance between the user and the display device 13 is more than the reference distance. A size of a selected page needs to be zoomed in.

Figure 6:
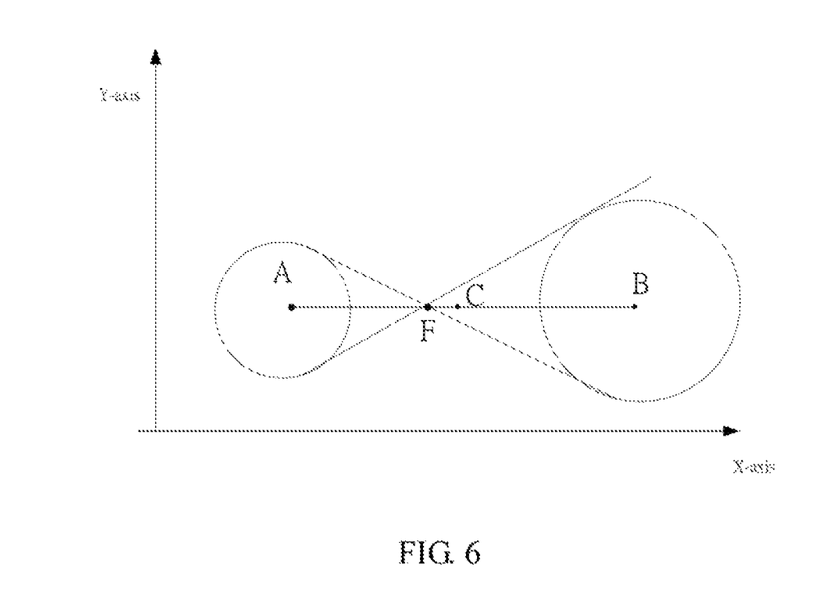
FIG. 6 is a diagram of a third example of a computed circumcircle and a reference circumcircle.

As shown in FIG. 6, "A" represents the center of the reference circumcircle, "B" represents the center of the computed circumcircle, "C" represents the midpoint of the segment "AB", "F" represents a computed intersection point. An offset of the computed intersection point "F" relative to the midpoint "C" is a distance between the computed intersection point "F" and the computed midpoint "C". An X-coordinate of the computed intersection point "F" is less than an X-coordinate of the midpoint "C". A direction offset of the computed intersection point "E" relative to the midpoint "C" is negative; therefore, an adjustment direction of a selected page is a negative direction. It is represented that the distance between the user and the display device 13 is less than the reference distance. A size of a selected page needs to be zoomed out.

The adjustment module 104 adjusts the selected page according to the adjustment ratio and the adjustment direction of the selected page. In at least one embodiment, when the adjustment direction is a positive direction, the adjustment module 104 zooms in the selected page according to the adjustment ratio. The adjustment module 104 zooms out the selected page according to the adjustment ratio when the adjustment direction is a negative direction. When the adjustment ratio is zero, the adjustment module 104 does not adjust the selected page.

Figure 3:
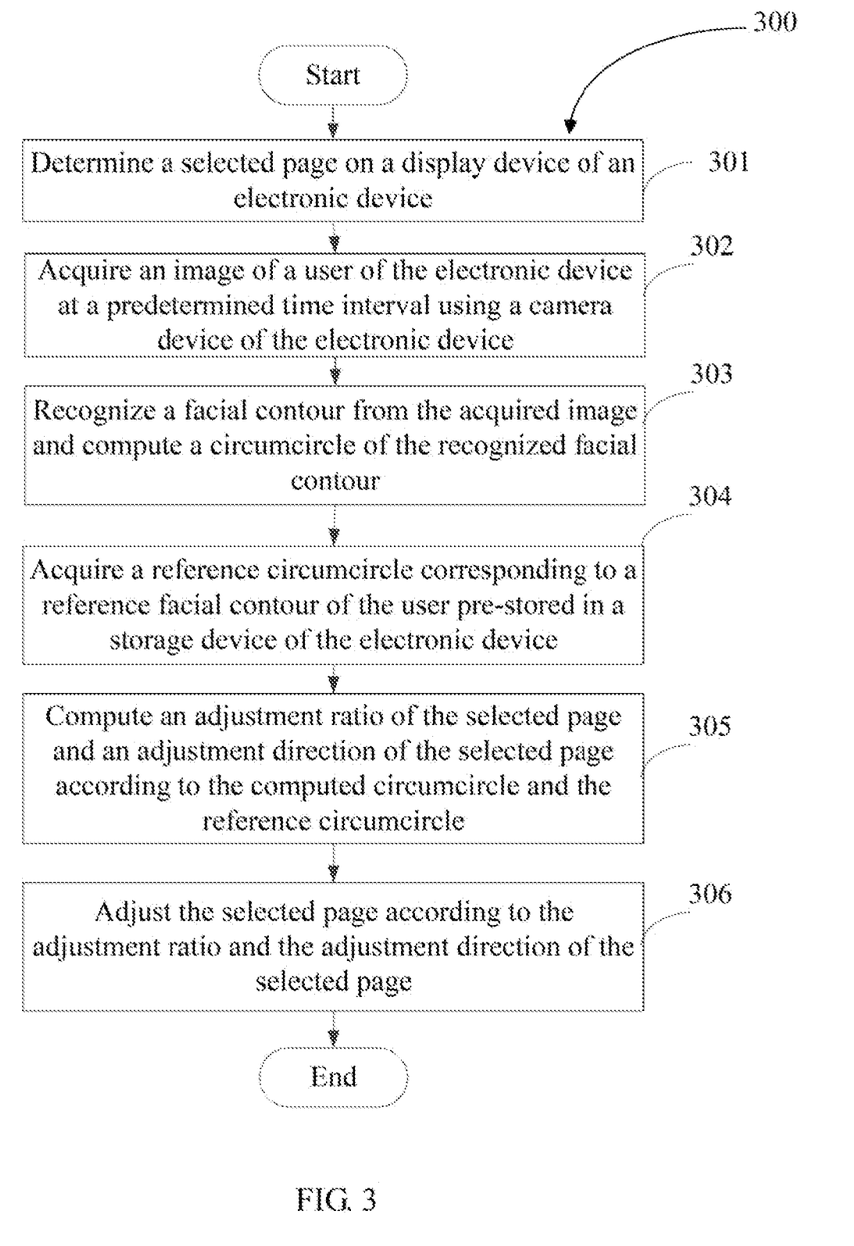
FIG. 3 is a flowchart of one embodiment of a method for adjusting characters of a page using the electronic device of FIG. 1.

FIG. 3 illustrates a flowchart is presented in accordance with an example embodiment. An example method 300 is provided by way of example, as there are a variety of ways to carry out the method. The example method 300 described below can be carried out using the configurations illustrated in FIGS. 1 and 2 for example, and various elements of these figures are referenced in explaining example method 300. Each block shown in FIG. 3 represents one or more processes, methods, or subroutines carried out in the example method 300. Furthermore, the illustrated order of blocks is by example only and the order of the blocks can be changed. The example method 300 can begin at block 301. Depending on the embodiment, additional steps can be added, others removed, and the ordering of the steps can be changed.

At block 301, when the user selects a page on a display device of an electronic device, a determination module determines the selected page. For example, the selected page can be a web page, a page provided by an application, a page of user interface (UI) of the electronic device.

At block 302, a camera module of the electronic device captures an image of the user at a predetermined time interval. An acquiring module acquires the image of the user.

At block 303, an recognizing module recognizes a facial contour from the acquired image. The recognizing module computes a circumcircle of the recognized facial contour.

At block 304, a reference facial contour of the user and a reference circumcircle corresponding to the reference facial contour are pre-stored in a storage device of the electronic device. The acquiring module acquires the reference circumcircle from the storage device. In at least one embodiment, an adjustment system provides a plurality of facial contours for the user to set or select the reference facial contour. Each of the facial contours has a different size. In at least one embodiment, each of the facial contours corresponds to a distance. The read distance represents a distance between the user and the display device. The reference facial contour corresponds a reference distance.

At block 305, a computation module computes an adjustment ratio of the selected page and an adjustment direction of the selected page according to the computed circumcircle and the reference circumcircle.

In at least one embodiment, the computation module establishes a coordinate system according to the computed circumcircle and the reference circumcircle. A distance between a center of the computed circumcircle and a center of the reference circumcircle is predetermined. The distance is more than zero. The coordinate system can be a two-dimensional coordinate system or a three-dimensional coordinate system.

It is assumed that a two-dimensional coordinate system is to be established, the computation module connects the center of the computed circumcircle and the center of the reference circumcircle using a line. The computation module establishes an X-axis of the two-dimensional coordinate system that is parallel to the line. A positive direction of the X-axis is the same as a direction from the center of the reference circumcircle to the center of the computed circumcircle. The computation module establishes a line that is perpendicular to the X-axis as a Y-axis of the two-dimensional coordinate system.

The computation module computes a midpoint of a segment on the coordinate system. The segment includes a first endpoint and a second endpoint. In at least one embodiment, the first endpoint of the segment is the center of the computed circumcircle, and the second endpoint of the segment is the center of the reference circumcircle.

The computation module computes two internal common tangents between the computed circumcircle and the reference circumcircle on the coordinate system. The computation module computes an intersection point of the two internal common tangents. The computation module computes an offset of the computed intersection point relative to the computed midpoint of the segment and computes the adjustment ratio based on the computed offset. In at least one embodiment, the adjustment ratio is computed by multiplying the computed offset by a predetermined constant k. k is more than one. The computation module computes the adjustment direction by computing a direction offset of the computed intersection point relative to the computed midpoint of the segment. In at least one embodiment, when an X-coordinate of the computed intersection point is less than an X-coordinate of the midpoint on the coordinate system, the direction offset is a negative direction, the adjustment direction is the negative direction. When the X-coordinate of the computed intersection point is more than the X-coordinate of the midpoint on the coordinate system, the direction offset is a positive direction, the adjustment direction is the positive direction.

At block 306, an adjustment module 104 adjusts the selected page according to the adjustment ratio and the adjustment direction of the selected page. In at least one embodiment, when the adjustment direction is a positive direction, it is represented that a distance between the user and the display device is more than the reference read distance, the adjustment module zooms in the selected page according to the adjustment ratio. When the adjustment direction is a negative direction, it is represented that the distance between the user and the display device is less than the reference read distance; the adjustment module zooms out the selected page according to the adjustment ratio. When the adjustment ratio is zero, the adjustment module does not adjust the selected page.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computer-implemented method for adjusting a page using an electronic device being executed by a processor of the electronic device, the method comprising:

determining a selected page on a display device of the electronic device;

acquiring an image of a user of the electronic device at a predetermined time interval using a camera module of the electronic device;

recognizing a facial contour from the acquired image and computing a circumcircle of the recognized facial contour;

acquiring a reference circumcircle corresponding to a reference facial contour of the user pre-stored in a storage device of the electronic device;

computing an adjustment ratio of the selected page and an adjustment direction of the selected page according to the computed circumcircle and the reference circumcircle; and adjusting the selected page according to the adjustment ratio and the adjustment direction of the selected page.

2. The method according to claim 1, wherein the adjustment ratio is computed by:

establishing a coordinate system according to the computed circumcircle and the reference circumcircle;

computing a midpoint of a segment on the coordinate system, a first endpoint of the segment being a center of the computed circumcircle and a second endpoint of the segment being a center of the reference circumcircle;

computing two internal common tangents between the computed circumcircle and the reference circumcircle on the coordinate system;

computing an intersection point of the two internal common tangents;

computing an offset of the computed intersection point relative to the computed midpoint of the segment and computing the adjustment ratio based on the computed offset; and computing the adjustment direction by computing a direction offset of the computed intersection point relative to the computed midpoint of the segment.

3. The method according to claim 2, wherein the adjustment ratio is computed by multiplying the computed offset by a predetermined constant.

4. The method according to claim 2, wherein a positive direction of an X-axis of the coordinate system is the same as a direction from the center of the reference circumcircle to the center of the computed circumcircle.

5. The method according to claim 4, further comprising:

zooming in the selected page according to the adjustment ratio when the adjustment direction is a positive direction; or zooming out the selected page according to the adjustment ratio when the adjustment direction is a negative direction.

6. An electronic device, comprising:

at least one processor; and a storage device that stores one or more programs, when executed by the at least one processor, cause the at least one processor to:

determine a selected page on a display device of the electronic device;

acquire an image of a user of the electronic device at a predetermined time interval using a camera module of the electronic device;

recognize a facial contour from the acquired image and compute a circumcircle of the recognized facial contour;

acquire a reference circumcircle corresponding to a reference facial contour of the user pre-stored in a storage device of the electronic device;

compute an adjustment ratio of the selected page and an adjustment direction of the selected page according to the computed circumcircle and the reference circumcircle; and adjust the selected page according to the adjustment ratio and the adjustment direction of the selected page.

7. The electronic device according to claim 6, wherein the adjustment ratio is computed by:

establishing a coordinate system according to the computed circumcircle and the reference circumcircle;

computing a midpoint of a segment on the coordinate system, a first endpoint of the segment being a center of the computed circumcircle and a second endpoint of the segment being a center of the reference circumcircle;

computing two internal common tangents between the computed circumcircle and the reference circumcircle on the coordinate system;

computing an intersection point of the two internal common tangents;

computing an offset of the computed intersection point relative to the computed midpoint of the segment and computing the adjustment ratio based on the computed offset; and computing the adjustment direction by computing a direction offset of the computed intersection point relative to the computed midpoint of the segment.

8. The electronic device according to claim 7, wherein the adjustment ratio is computed by multiplying the computed offset by a predetermined constant.

9. The electronic device according to claim 7, wherein a positive direction of an X-axis of the coordinate system is the same as a direction from the center of the reference circumcircle to the center of the computed circumcircle.

10. The electronic device according to claim 9, wherein the at least one processor further:

zooms in the selected page according to the adjustment ratio when the adjustment direction is a positive direction; or zooms out the selected page according to the adjustment ratio when the adjustment direction is a negative direction.

11. A non-transitory storage medium having stored thereon instructions that, when executed by a processor of an electronic device, causes the processor to perform an adjustment method, wherein the method comprises:

determining a selected page on a display device of the electronic device;

acquiring an image of a user of the electronic device at a predetermined time interval using a camera module of the electronic device;

recognizing a facial contour from the acquired image and computing a circumcircle of the recognized facial contour;

acquiring a reference circumcircle corresponding to a reference facial contour of the user pre-stored in a storage device of the electronic device;

computing an adjustment ratio of the selected page and an adjustment direction of the selected page according to the computed circumcircle and the reference circumcircle; and adjusting the selected page according to the adjustment ratio and the adjustment direction of the selected page.

12. The non-transitory storage medium according to claim 11, wherein the adjustment ratio is computed by:

establishing a coordinate system according to the computed circumcircle and the reference circumcircle;

computing a midpoint of a segment on the coordinate system, a first endpoint of the segment being a center of the computed circumcircle and a second endpoint of the segment being a center of the reference circumcircle;

computing two internal common tangents between the computed circumcircle and the reference circumcircle on the coordinate system;

computing an intersection point of the two internal common tangents;

computing an offset of the computed intersection point relative to the computed midpoint of the segment and computing the adjustment ratio based on the computed offset; and computing the adjustment direction by computing a direction offset of the computed intersection point relative to the computed midpoint of the segment.

13. The non-transitory storage medium according to claim 12, wherein the adjustment ratio is computed by multiplying the computed offset by a predetermined constant.

14. The non-transitory storage medium according to claim 12, wherein a positive direction of an X-axis of the coordinate system is the same as a direction from the center of the reference circumcircle to the center of the computed circumcircle.

15. The non-transitory storage medium according to claim 14, wherein the method further comprises:
   zooming in the selected page according to the adjustment ratio when the adjustment direction is a positive direction; or
   zooming out the selected page according to the adjustment ratio when the adjustment direction is a negative direction.

\* \* \* \* \*